United States Patent [19]

Bošković et al.

[11] Patent Number: 5,124,162
[45] Date of Patent: Jun. 23, 1992

[54] SPRAY-DRIED FIXED FLAVORANTS IN A CARBOHYDRATE SUBSTRATE AND PROCESS

[75] Inventors: Marijan A. Bošković Ridgefield, Conn.; Susan M. Vidal, Patterson; Fouad Z. Saleeb, Pleasantville, both of N.Y.

[73] Assignee: Kraft General Foods, Inc., Northfield, Ill.

[21] Appl. No.: 798,332

[22] Filed: Nov. 26, 1991

[51] Int. Cl.⁵ .............................................. A23L 1/221
[52] U.S. Cl. ..................................... 426/96; 426/650; 426/651
[58] Field of Search .......................... 426/96, 650, 651

[56] References Cited

U.S. PATENT DOCUMENTS

| | | |
|---|---|---|
| 2,809,895 | 10/1957 | Swisher . |
| 2,856,291 | 10/1958 | Schultz . |
| 2,857,281 | 10/1958 | Schultz . |
| 2,919,989 | 1/1960 | Schultz . |
| 3,041,180 | 1/1961 | Swisher . |
| 3,314,803 | 4/1967 | Dame et al. . |
| 3,554,768 | 1/1971 | Feldman . |
| 3,704,137 | 11/1972 | Beck . |
| 3,971,852 | 7/1976 | Brenner et al. ...................... 426/103 |
| 4,532,145 | 7/1985 | Saleeb et al. ........................ 426/650 |
| 4,610,890 | 9/1986 | Miller et al. ........................ 426/651 |
| 4,689,235 | 8/1987 | Barnes et al. ........................ 426/89 |
| 4,707,367 | 12/1987 | Miller et al. ........................ 426/96 |
| 4,820,534 | 4/1989 | Saleeb et al. ........................ 426/96 |
| 5,009,900 | 4/1991 | Levine et al. ........................ 426/96 |

Primary Examiner—Joseph Golian
Attorney, Agent, or Firm—Thomas R. Savoie

[57] ABSTRACT

An antioxidant free, stable, fixed flavor is prepared from a mixture of flavor, maltose, malto-dextrin and a carbohydrate film former by spray-drying the mixture to form a dense product of at least 0.5 g/cc bulk free flow density and less than 20% voids, which is stable against oxidation for one year at 70° F.

19 Claims, 2 Drawing Sheets

SPRAY-DRIED FIXED FLAVORANTS IN A CARBOHYDRATE SUBSTRATE AND PROCESS

BACKGROUND OF THE INVENTION

The present invention relates to a method for fixing volatile substances, and more particularly to a method for fixing a volatile substance in an amorphous substrate and the products derived therefrom.

In efforts to give the consumer a fresher tasting reconstitutable beverage mix, it has been found that certain natural or synthetic volatile compounds improve the consumer's taste perception thereof. Unlike liquid systems which usually retain flavorants without adverse stability problems, dry comestible beverage mixes, are often lacking in flavor or have off-flavors due to poor storage stability. A fresh tasting, reconstituted, dry beverage would increase the consumer's perception of freshness which is of paramount importance.

Such compounds as coffee aroma, esters, acetaldehyde, various essential oils, and sulphur compounds, augment or enhance the taste perception of convenience foods. Dry comestible mix systems present special problems when one tries to introduce volatile or aromatic flavorants therein. For example, such materials escape through and from the mix, or react so as to degrade or oxidize into compounds which are recognized to be less desirable. Therefore, there has been a longstanding need to fix by encapsulation, and prevent the escape of volatiles within a "powdered-mix" comestible. Moreover, the method for fixing a volatile must produce a product which is easily reconstitutable and is capable of holding the fix over prolonged periods and under adverse storage conditions.

A major problem inherent in fixing aromatics in food acceptable substrates is the fact that those fixation substrates display idiosyncratic fixation characteristics. The substrate media may be sensitive to moisture, react with the entrained volatile or produce flavor off-notes. Carbohydrates as a class offer a food-acceptable substrate in which volatiles and aromatics have been fixed, however, most water-soluble carbohydrate substrates are hygroscopic and will not reliably hold the fix for long periods. In view of the foregoing, there is a recognized need for an amorphous, moisture-stable, water-soluble, food-approved substrate to encapsulate aromatic or volatile flavorants.

Where flavors, such as essential oils, are not protected by antioxidant, even further problems of off-flavor development are encountered due to oxidation caused by inability of the carbohydrate to protect the flavor from oxygen.

DESCRIPTION OF THE PRIOR ART

In the beginning, flavor encapsulation technology merely strived to furnish dry forms of liquid flavors, for the convenience of handling and uniformity of strength. An empirical approach prevailed. With the increased assortment of products and consumer demands, quality and better understanding of flavor encapsulation brought additional demands. Even then, the initial efforts concentrated on the overall retention of flavor (yield) and process economics, followed by the more specific inquiries into retention of individual flavor notes and maintenance of the flavor profile. Long-range stability and "fidelity" of an encapsulated flavor, as well as reduction of its sensitivity to oxidation, began to be explored only recently.

There are only two technologies of commercial importance in flavor encapsulation: spray-drying and extrusion. The spray-drying technology is cheaper but its product is of necessity more porous and thus more sensitive to loss of volatiles, ingress of oxygen, and mechanical damage. Spray drying does furnish a product of very fine particle size, suitable for quick and complete dissolution, and also having very fine and uniform globule size of essential flavor oil which provides for uniform flavor distribution and delivery in the prepared beverage. The product of extrusion technology is extremely stable against both oxygen ingress and loss of volatiles; it is also quite resilient mechanically. Due to lower oil yields and washing-associated costs, extruded flavors are considerably more expensive; limited to loading of volatiles up to 14%; and furnish a product with coarser, less uniform globule size. These factors can be undesirable in use, leading to separation of flavor oil on prolonged storage of prepared beverage and non-uniform beverage strength. There have been many attempts to fix volatiles and aromatics for dry beverages. The most notable attempts to create such dry products are outlined as follows.

U.S. Pat. No. 2,856,291 and U.S. Pat. No. 2,857,281, issued to Schultz, disclose a method for incorporating a volatile flavoring substance in a sugar substrate. A mixture of the sugar, flavor oil and water, is prepared and blended to form an emulsion. Among the flavoring materials used are flavor oils, such as orange oil and lemon oil and synthetic agents such as aldehydes, alcohols, esters, and other volatile agents.

U.S. Pat. No. 2,809,895, to Swisher, describes a process for encapsulation of an essential oil, such as lemon, lime or grapefruit oils, in a matrix comprising corn syrups, antioxidant and a dispersing agent. The essential oil, antioxidant and dispersing agent are added to the corn syrup, the resultant mixture is heated to 85° to 125° C. and extruded to produce an emulsion in pellet form, and the resultant particles are washed with an essential oil solvent and dried under vacuum to remove the solvent.

U.S. Pat. No. 2,919,989, to Schultz, describes a modification of the process of the aforementioned U.S. Pat. No. 2,856,291, in which the sugar base used comprises, by weight, 15% to 40% sucrose, 10% to 50% lactose, 5% to 14% maltose, 10% to 50% dextrose and not more than 15% dextrin.

U.S. Pat. No. 3,041,180, to Swisher, describes an essential oil flavoring composition produced by mixing glycerol and 42 DE corn syrup solids into an aqueous, semiplastic mass, which is then combined with the essential oil by means of an emulsifier. The resulting mixture is extruded into a cold solvent to form an extruded solid in which the essential oil is encapsulated by the glycerol and corn syrup solids. This extruded solid is then dried and an anti-caking agent added to produce an extruded particulate solid having an extended shelf life.

U.S. Pat. No 3,704,137, to Beck, describes an essential oil composition formed by mixing oil with an antioxidant, separately mixing water, sucrose and hydrolyzed cereal solids (dextrose equivalent (DE) substantially below 29, and preferably between 10 and 15), emulsifying the two mixtures together, extruding the resultant mixture in the form of rods into a solvent, removing excess solvent and finally adding an anti-caking agent, preferably silica.

U.S. Pat. No. 3,971,852, to Brenner, et al., describes a process for encapsulating an oil in a matrix comprising a polysaccharide (which may be dextrinized starch or hydrolyzed starch having a DE of 10 to 25) and a polyhydroxy material, which can be glucose, maltose or fructose. The ingredients are emulsified and spray dried.

U.S. Pat. Nos. 4,610,890 and 4,707,367, to Miller, et al., describe a process for preparing a solid essential oil composition having a high content of the essential oil. This composition is prepared by forming an aqueous solution in a closed vessel under controlled pressure conditions to form a homogeneous melt, which is then extruded into a relatively cold solvent, dried and combined with an anticaking agent.

U.S. Pat. No. 4,689,235, to Barnes, et al., describes a process which involves generally the same steps as in the aforementioned U.S. Pat. No. 4,610,890 but in which the solution used for encapsulation comprises a mixture of a malto-dextrin and hydrogen octenyl butanedioate.

U.S. Pat. No. 3,314,803, issued to Dame, et al., provides a method for fixing a volatile flavor such as acetaldehyde in a mannitol substrate. The acetaldehyde is fixed in mannitol by first forming a solution of mannitol and water and preferably a supersaturated solution of mannitol of between 25% to 45% by weight. The supersaturated solution is formed by heating with agitation 2 to 10 parts by weight of mannitol with 10 parts by weight of water at 180° to 212° F. until all of the mannitol is dissolved in the water and no mannitol crystals remain in the solution. The solution is then cooled while acetaldehyde is added thereto. The reference solution is then spray-dried.

U.S. Pat. No. 3,554,768, issued to Feldman, provides a method for fixing acetaldehyde in selected carbohydrates, by uniformly mixing the acetaldehyde and carbohydrate in water and drying to form a flavor enhancing composition.

It should be noted that stability of the Feldman product is dependent on maintaining the product in a hermetically-sealed environment and on use of an antioxidant or oxygen free packaging.

In the aforementioned prior art examples, the disadvantage of using the above-enumerated compounds or methodologies is the low fix obtained therefrom, or the moisture-lability of the resultant products. Stability of previously available products is in most cases dependent on a hermetically-sealed product environment, which is kept free from ambient moisture levels and from oxygen.

In all commercial products, antioxidants have to be added to prevent oxidation of the flavors fixed in the dry substrate.

Some improvement in stability was obtained by incorporating the flavorants in a glassy carbohydrate. In U.S. Pat. No. 4,820,534, issued to Saleeb, et al., there is provided a method of fixing volatiles, such as essential oils in an extruded glass substrate using 10% to 30% low molecular weight carbohydrates and at least 70% high molecular weight material such as malto-dextrin. Stable fixes are obtained from this somewhat expensive extrusion process. In a similar system, U.S. Pat. No. 5,009,900, issued to Levine, et al., there is provided an extruded glassy matrix for volatiles comprising 40% to 80% chemically modified starch, 10% to 40% by weight maltodextrin, 5% to 20% by weight corn syrup solid or a polyglucose and 5% to 20% mono and disaccharide.

U.S. Pat. No. 4,532,145, issued to Saleeb, et al., provides a method of fixing volatiles, such as acetaldehyde in a spray-dried amorphous substrate of 10% to 30% low molecular weight carbohydrate and at least 70% high molecular weight material such as maltro-dextrin. The fix in the lower weight spray-dried product was better than using earlier carbohydrate systems but not as good as obtained by extrusion.

Some previously available fixation media display a great degree of crystallinity. Crystallinity appears to reduce the interstitial macro-molecular space wherein volatile flavorants may be entrapped and held. It has been found that with an increase in crystallinity there is a concomitant decrease in the ability of the substrate to "fix" volatiles. On the other hand, there are several classes of non-crystalline compounds which also appear to be unsuitable fixation media. Certain film forming gums such as gum arabic and waxy starches, present "leaky" substrates, a substrate whose structure will not retain the entrapped acetaldehyde component over time.

Naturally occurring citrus oils are susceptible toward oxidation —by atmospheric oxygen or otherwise —and are thus often protected by the addition of synthetic or natural antioxidants such as BHA or mixed tocopherols. With the increased consumer awareness and intolerance toward so-called chemical additives, preservatives are seen as being less desirable on labels of food products. Indeed, it is possible to reason that the perfect "encapsulation" would alleviate the need for any preservative whatsoever—if the oil were sufficiently well protected, oxygen could not access it, and the volatiles would remain sealed. Shelf-life would be extremely long.

This is presently not the case. Even though extrusion of glass matrix provides good protection to the oil, all patents on extruded flavors, in all their examples, exclusively teach application of chemically-preserved citrus oil.

SUMMARY OF THE INVENTION

One of the objectives of the current invention is to provide spray-dried encapsulated flavor which would in its properties approach if not completely attain or exceed the advantages provided by the extruded flavors while still keeping those benefits associated with the spray-drying technology.

Surprisingly, we have found that when a film forming carbohydrate is introduced into a carbohydrate matrix of malto-dextrins and mono and disaccharide sugars containing a major amount of maltose, it is possible to spray-dry flavorant contained in such a matrix and obtain very dense spray-dried particles which are as stable as the extruded flavorants.

According to the present invention, the volatile or aromatic substance is fixed within an amorphous carbohydrate substrate consisting of an admixture of low molecular weight, water-soluble mono or disaccharide containing a major amount of maltose, a film forming high molecular weight material such as a gum and/or chemically modified starch and a high molecular weight, water-soluble polymer such as malto-dextrin. Fruit solids are included in the amount of mono and disaccharide employed. The combination of materials is dissolved in water to form an aqueous solution with the temperature being maintained at around 10° to 90° C. In the case of highly volatile substance the solution is allowed to cool to about the boiling point of the substance or below. The volatile or aromatic flavorant is then added to the solution, the solution being preferably maintained at from 10° to 50° C. The solution is then spray-dried in an atmospheric spraydryer wherein the inlet temperature is typically about 100° to 180° C. and the outlet temperature typically 70° C. to 100° C. The resultant moisture-stable, fixed product has a bulk free flow density of at least 0.50 g/cc, excellent retention of volatiles over time and a prolonged shelf life without unacceptable oxidation. No antioxidant is added or made part of the final product.

Another objective of this invention, then, is to devise a spray-dried encapsulated flavor of such quality that it could be rendered as "preservative-free", i.e. without use of synthetic or natural antioxidant preservatives and yet afford sufficient protection during the distribution and use of such an ingredient in instant food mixes.

DETAILED DESCRIPTION OF THE INVENTION

Figure 1:
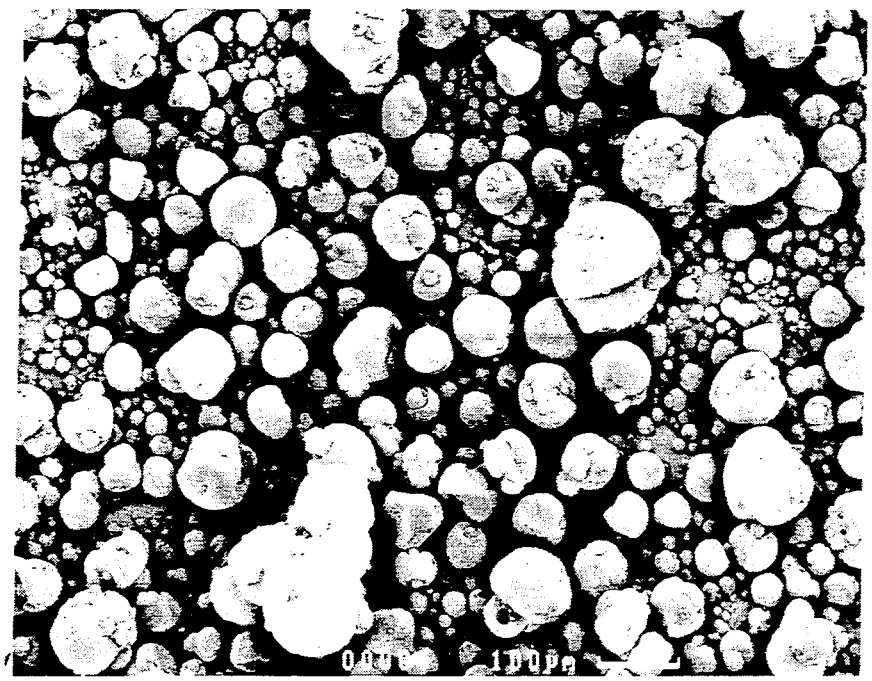
FIG. 1 is a spray-dried material made in accordance with this invention, magnified 100× using an electron microscope.

There follows the method of fixing volatile agents in an amorphous or "glassy" substrate, so that a dense, moisture-stable and heat-stable product free of antioxidant, and having high levels of flavorant is obtained. The volatile agent will be described as an essential oil (e.g. orange oil) product although other volatile flavorants may be operatively substituted.

The term high molecular weight water-soluble polymer includes such materials as malto-dextrin, a material possessing a predominate amount of polysaccharide. Typically, malto-dextrin has a D.E. (dextrose equivalent) of from 4 to 20 and is composed of varying numbers of monosaccharides, dissacharides and larger saccharide units. For example, LO-DEX TM 5 and 15 (malto-dextrins manufactured by American Maize Products Company,) contain less than 1% monosaccharides, less than 2% disaccharides and less than 2% trisaccharides for LO-DES TM 5 and less than 3% monosaccharides, 2% disaccharides, and 2% trisaccharides for LO-DEX TM 15. In the malto-dextrins used herein, (LO-DEX TM 5, 10, 15), the content of tetrasaccharides or higher member carbohydrates exceeds 93% by weight of the maltodextrin.

Low molecular weight water-soluble materials, for illustrative purposes of the present invention, are mono and disaccharides such as glucose, fructose, maltose, sucrose or materials high in such sugars such as fruit juice solids. At least 50% of the mono and disaccharide material used in this invention is maltose.

The film forming carbohydrate can be gums, such as gum arabic, gum accacia, a chemically modified starch, such as N-Lok manufactured by National Starch Chemical Corp. or mixtures thereof.

The carbohydrate matrix includes from 22% to 50%, preferably 25% to 45% mono and disaccharides or substances containing these sugars such as fruit juice solids.

In general, disaccharides are preferred over monosaccharides because the higher molecular weight of the disaccharides gives them a higher melting temperature and a lower hygroscopicity. Among the disaccharides, maltose is preferred over sucrose, because maltose melts at a much lower temperature than does sucrose.

Of the mono and disaccharides and juice solids at least 50% must be maltose, preferably present at from 15% to 30% and more preferably from 20% to 25% of the carbohydrate mixture. The maltose can be obtained using high maltose corn syrup at from 10% to 30%, preferably 15% to 25% of the carbohydrate mixture. Juice solids may range from 0% to 20%, preferably 5% to 20% and more preferably from 10% to 15% of the carbohydrate matrix.

The carbohydrate matrix also includes from 25% to 60%, preferably from 30% to 50% and most preferably from 35% to 45% by weight of a malto-dextrin. The malto-dextrin will preferably have a dextrose equivalent in the range of about 5 to 15. Preferred malto-dextrins are those having a DE in the range of about 8 to about 12. As those skilled in the food industry are well aware, a variety of malto-dextrins meeting these requirements are readily available commercially; specific malto-dextrins which have been found to give good results in the present process are sold as Lodex 5, 10 or 15 by American Maize-Products Co., Hammond, Ind.

The carbohydrate film former used herein is present in from 10% to 40%, preferably from 15% to 35% and most preferably from 20% to 30% of the carbohydrate forming the matrix. Suitable film formers are film forming gums or hydrocolloids and chemically modified starch. Effective gums are gum arabic and gum accacia. Suitable chemically modified starch is N-Lok or Capsul (National Starch and Chemical Corp).

Optionally up to 20%, preferably less than 10% of the carbohydrate can be corn syrup solids or polydextrose. The term "corn syrup solids" is conventionally used to denote the mixture of carbohydrates produced by hydrolysis of corn starch. However, although such carbohydrates are usually produced by hydrolysis of high molecular weight starch, any carbohydrates having the required dextrose equivalents may be employed in the matrices of the present invention. In particular, such carbohydrates may be produced by polymerization of lower molecular weight carbohydrates rather than hydrolysis of high molecular weight starches. "Polydextrose", produced commercially by Pfizer, is the trade name for a glucose oligomer having a glass transition temperature comparable to that of medium dextrose equivalent corn syrup solids, and such polydextrose may be employed in place of corn syrup solids.

It is also possible to use high maltose corn syrup which contains a major amount (more than 60%) by weight of maltose and the remainder corn syrup solids.

The carbohydrate matrix may be softened by the addition of up to 5% of an edible polyol such as glycerine, preferably 1% to 3% of the fixed product.

The final spray dried product is capable of protecting and retaining up to 50% flavorant depending of the flavorant, up to 25% for essential oils, and preferably from 10% to 20% on a solids basis for essential citrus oils. A special feature of this invention is the provision that the final product does not contain antioxidants, the carbohydrate matrix being sufficient for the first time to prevent oxidation of spray-dried fixed essential oils during storage for up to one year.

The procedure of spray-drying, for purposes of the present invention may be defined as follows. A solution of the product one wishes to make is prepared. The term solution is understood to mean mixtures of solutes and solvents encompassing such mixtures as emulsions or dispersions. The solution is fed into an atomizer which creates a fine mist, composed of regular-sized droplets. The misted-solution is introduced, usually through the top of a drying tower or chamber. Heated air is fed into the chamber so that as the droplets fall from the top of the chamber evaporation of the liquid phase or drying occurs. The product is collected from an outlet port. Examples of spray-drying apparatus are the Anhydro Dryers (manufactured by Anhydro Corp. of Attleboro Falls, Mass.) or the Niro Dryer (manufactured by Niro Atomizer Ltd, Copenhagen, Denmark).

Spray-drying is preferably employed using flavorant containing carbohydrate mixtures having at least 30%, preferably at least 40% solids which when dried using an outlet temperature normally below 100° C. there can be obtained dense, oxidative resistant fixed flavors.

A solution to the problem of how to optimize the inherent poor fixative properties of polysaccharides or other higher molecular weight materials is solved by combining the high molecular weight material with film formers and mono and disaccharides high in maltose. The mono and disaccharides are at least 50% and preferably all maltose to increase the structural integrity of the structurally weak high molecular weight material which is normally malto-dextrin. This combination forms unexpectedly dense substrates which are relatively non-hygroscopic. It appears film formers and low molecular weight materials, such as maltose, beneficially affect the fixation qualities of the high molecular weight malto-dextrin materials.

The addition of from 22% to 50% mono and disaccharide wherein at least 50% is maltose and the combination of from 10% to 40% by weight film forming carbohydrate such as gum arabic with the 25% to 60% malto-dextrin gives a carbohydrate substrate which can be dried in a spray-drier to a dense free-flowing particle having a bulk density of at least 0.5 g/cc, preferably greater than 0.55 g/cc, and most preferably 0.6 g/cc or greater. This material has an pycnometry absolute density (measured by helium pycnometry) of 1.15 g/cc or greater, preferably greater than 1.25 g/cc and most preferably 1.35±0.1 g/cc. The carbohydrate mixture forms a matrix around the individual particles of flavorant preventing their loss on storage. Whereas normal spray-dried particles have a free flow bulk density of some 0.20 to 0.3 g/cc and internal void or porosity of 50% to 90% of the matrix, the spray-dried carbohydrate mixture of this invention has a free flow bulk density of at least 0.55 g/cc, preferably 0.6 g/cc or greater and a void or free volume of less than 20%, preferably less than 10% of the total spray dried particle volume. This freedom from voids in the spray-dried product of this invention insures more carbohydrate surrounds the particles of flavorant without cracks or voids allowing a means for the flavorant to escape from the carbohydrate matrix. The difference in void structure is easily seen by comparing FIGS. 1 and 2 with FIGS. 3 and 4.

The quality of encapsulated flavors is measured and quantified in several ways in the following examples.

Oil load, or flavor "fix" (in weight percent) is usually assayed by dissolving the matrix and distilling over the immiscible oil, which is then volumetrically measured and recalculated to the original flavor amount (hydrodistillation with the Clevenger collection trap).

Surface, or unencapsulated, oil (in weight percent) is measured by washing the encapsulate with a light organic solvent for oil which however does not dissolve the matrix (e.g., hexane); the washings are assayed for the citrus oil content by UV spectrophotometry or gas chromatography. If standard spray-dried flavor of 15% to 20% load has a surface oil content of 0.10% or more of an unpreserved citrus oil—the product will not be stable in storage. Oxidized surface oil will impair odor, aroma and flavor of the prepared beverage.

Absolute or True, density of an encapsulate (in g/cc) can be measured using helium gas as the picnometric fluid, and there are commercial instruments designed for this purpose. Since solids densities of matrix components and citrus oil are known, it is possible to find the percent void in the particle. A fuller particle with less than 20%, preferably less than 15% and most preferably less than 10% void space is mechanically stronger and more desirable.

Microscopy can reveal structural and morphological features of encapsulated particles, e.g. surface irregularities or cracks, particle damage, wall thickness and uniformity of oil globules in the matrix. Desirable qualities of these individual features will be obvious to those skilled in the art and are amply illustrated in FIG. 2.

Oxygen uptake (in meq oxygen per kg oil) is a measure of matrix permeability to oxygen and thus related to the oxidative stability of an encapsulate. The encapsulate can be placed in a hermetically-capped glass bottle and exposed to an elevated temperature (e.g., 140° F.) for a standard period of time (e.g., 1 week). If oxygen content is measured initially and after storage, for example by gas chromatographic analysis of the headspace above the sample, then the amount of oxygen disappeared (taken up) can be calculated on the basis of the encapsulate oil content and thus standardized. It is assumed that the bottle; stopper; or matrix either do not consume oxygen, consume a negligibly small amount, or consume such amount that can be corrected by running a blank sample in parallel.

Set out hereinafter are examples of the instant process outlining the methodology proposed therein. The examples are merely for illustrative purposes and are not designed to in any way limit the instant invention.

A preferred embodiment of this invention is a spray-dried fixed flavor having a free flow density of 0.5 g/cc or greater, preferably 0.55 g/cc and most preferably 0.6 g/cc or more and void volume of less than 20%, preferably less than 15% and most preferably less than 10% comprising from 10% to 20% totally antioxidant free and preferably preservative free essential citrus oil, from 10% to 30%, preferably 15% to 25% and most preferably about 20%, mono and disaccharide, having at least 50% maltose and more preferably 80% or more maltose and most preferably all maltose, from 10% to 30%, preferably 15% to 25% and most preferably about 20% film forming gum or modified starch, preferably a major amount of which is gum arabic and most preferably all gum arabic, from 20% to 50%, preferably 25% to 40% and most preferably about 33% malto-dextrin, from 1% to 20%, preferably 5% to 15% and most preferably about 10% fruit juice solids, from 1% to 5% polyol, preferably glycerine and most preferably an anti-caking agent.

EXAMPLES 1-3

Several examples were run to examine the effect of prior art carrier compositions and the amount of essential oil loading upon the stability of encapsulated citrus oil. The following formulations were prepared by dissolving or dispersing the carrier in warm water at 90° F. Single-fold, cold-pressed lemon oil without any added antioxidant preservatives was added with stirring, and the prepared feed was homogenized using a Ross (model 100L) laboratory mixer-emulsifier at about 9,000 RPM for 10 minutes. Homogenized feed was dried in a laboratory-scale spraydryer (Anhydro, model Lab) using rotary plate atomizer at 17,000 RPM. Inlet air temperature was kept at 150° C., resulting in the outlet air temperature in the 80° to 90° C. range. The formulations spray dried were:

|  | EXAMPLE 1 | EXAMPLE 2 | EXAMPLE 3 |
|---|---|---|---|
| Composition, in parts: |  |  |  |
| N-Lok modified food starch | 18 | 16 | — |
| Lodex-10 malto-dextrin | 18 | 16 | — |
| Gum Arabic | — | — | 27 |
| Water | 60 | 60 | 70 |
| Lemon Oil, unpreserved | 4 | 8 | 3 |
| Total | 100 | 100 | 100 |
| % solids in feed | 40 | 40 | 30 |
| % oil load in solids | 10 | 20 | 10 |
| Bulk density, g/cc | 0.37 | 0.36 | — |
| % surface oil | 0.01 | 0.17 | 0.20 |
| O₂ uptake, meq/kg oil | 840 | 971 | 222 |
| Acceptability |  |  |  |
| after 12 wks/90° F. | Borderline | Still Acc. | Still Acc. |
| after 1 yr/70° F. | Unacceptable | Unacceptable | Unacceptable |

Encapsulate stability was evaluated by measuring % surface oil, oxygen uptake and acceptability in dry beverage mix stored through the indicated time/temperature regimens. Unacceptable quality can be characterized as a "terpeney" flavor with solvent-like flavor notes.

EXAMPLE 4

The Lemon oil from Examples 1 to 3 was encapsulated using the carbohydrate carrier composition of this invention.

The ingredients were dissolved as previously indicated. Homogenization was carried out in a Manton-Gaulin homogenizer at 3,000 psig. The emulsified flavor solution was dried in a commercial-scale dryer (Anhydro, Model 14) using rotary atomizer at 8,000 RPM. Inlet air temperature was 360° to 380° F., and the outlet air temperature was 206° F. to 215° F.

|  | % Dry basis | % d.b. carbohydrate | EXAMPLE 4 |
|---|---|---|---|
| Composition, in parts: |  |  |  |
| Lodex-10 malto-dextrin | 14.2 | 40 | 14.9 |
| High-Maltose Corn Syrup, (81% maltose) | 8.6 | 24 | 10.6 |
| Lemon Juice Concentrate, 55° Brix | 4.6 | 13 | 8.3 |
| Gum Arabic | 8.1 | 23 | 9.0 |

-continued

|  | % Dry basis | % d.b. carbohydrate | EXAMPLE 4 |
|---|---|---|---|
| Magnesium Hydroxide |  |  | 0.6 |
| Glycerol |  |  | 0.9 |
| Water |  |  | 48.5 |
| Lemon Oil, unpreserved |  |  | 7.2 |
| Total |  | 100 | 100.0 |
| % solids in feed |  |  | 45.8 |
| % oil load in solids |  |  | 15.7 |
| % moisture |  |  | 4.6 |
| Bulk density, g/cc |  |  | 0.54 |
| % surface oil |  |  | 0.09 |
| O₂ uptake, meq/kg oil |  |  | 85 |
| Acceptability |  |  |  |
| after 12 wks/90° F. |  |  | Acceptable |
| after 1 yr/70° F. |  |  | Acceptable |

There was no objectionable development of oxidized off-flavor, and the sample quality was comparable to that of a comparable sample prepared with BHA-preserved lemon oil.

EXAMPLES 5-7

The raw materials were combined and processed as in Example 1-3. The citrus oil was California single-fold, cold-pressed orange oil. For comparison, oil was used without any added antioxidant preservatives or with 0.5% BHA antioxidant (as indicated below).

|  | EXAMPLE 5 | EXAMPLE 6 | EXAMPLE 7 |
|---|---|---|---|
| Composition, in parts: |  |  |  |
| N-Lok Starch | 16 | 16 | — |
| Corn Syrup Solids | 16 | 16 | — |
| Gum Arabic | — | — | 27 |
| Water | 60 | 60 | 70 |
| Orange Oil, | 8, unpres. | 8, w. BHA | 3, unpres. |
| BHA | No | Yes | No |
| Total | 100 | 100 | 100 |
| % solids in feed | 40 | 40 | 30 |
| % oil load in solids | 20 | 20 | 20 |
| % surface oil | 0.02 | — | 0.18 |
| O₂ uptake, meq/kg oil | 262 | 104 | 319 |
| Acceptability |  |  |  |
| after 12 wks/90° F. | Unacceptable | Still Acc. | Unacceptable |
| after 1 yr/70° F. | Unacceptable | Acceptable | Unacceptable |

The spray-dried samples with the unpreserved oil on standing developed an oxidized, atypical off-flavor with sharp, spice-like pungent character which was unacceptable.

EXAMPLE 8

Orange oil from Example 5-7 were encapsulated using the process and carrier composition of this invention. Homogenization was carried out in a Manton-Gaulin homogenizer at 6,000 psig. The emulsified flavor solution was dried in pilot-scale spray-dryer (Niro, model Utility) using rotary plate atomizer at 15,000 RPM. Inlet air temperature was 195° to 200° C., and the outlet temperature was in the 94° to 97° C. range.

|  | % Dry basis | % d.b. of carbohydrate | EXAMPLE 8 |
|---|---|---|---|
| Composition, in parts: |  |  |  |
| Lodex-10 malto-dextrin | 14.8 | 48 | 15.6 |
| High-Maltose Corn Syrup, (81% maltose) | 7.5 | 25 | 9.2 |

-continued

| | % Dry basis | % d.b. of carbohydrate | EXAMPLE 8 |
|---|---|---|---|
| Gum Arabic | 5.8 | 19 | 6.4 |
| Orange Juice Concentrate, 65° Brix | 2.5 | 8 | 3.8 |
| Glycerol | | | 0.8 |
| Water | | | 57.5 |
| Orange Oil, unpreserved | | | 6.7 |
| Total | | 100 | 100.0 |
| % solids in feed | | | 40 |
| % oil load in solids | | | 16.8 |
| % moisture | | | 5.1 |
| Bulk density, g/cc | | | 0.55 |
| % surface oil | | | 0.04 |
| $O_2$ uptake, meq/kg oil | | | 34 |

EXAMPLE 9

Orange oil from Example 5-8 encapsulated using the process and carrier composition of this invention. Procedure and apparatus were analogous to those in Example 4 except a commercial sized spray-drier was used. Inlet air temperature was 340° F. to 345° F., and the outlet air temperature was 178° F. to 185° F.

| | EXAMPLE 9 |
|---|---|
| Composition, in parts: | |
| Lodex-10 malto-dextrin | 14.5 |
| High Maltose Corn Syrup Solids | 8.3 |
| Gum Arabic | 8.8 |
| Orange Juice Concentrate, 62° Brix | 7.1 |
| Glycerol | 0.9 |
| Orange Oil, unpreserved | 7.0 |
| Water | 53.4 |
| Total | 100.0 |
| % solids in feed | 43.8 |
| % oil load in solids | 16.0 |
| % moisture | 4.3 |
| Bulk density, g/cc | 0.65 |
| % surface oil | 0.04 |
| $O_2$ uptake, meq/kg oil | 60.0 |
| Acceptability | |
| after 12 wks/90° F. | Still Acc. |
| after 1 yr/70° F. | Still Acc. |

There was no objectionable development of oxidized off-flavor, and the sample quality was comparable to that of the sample prepared by extrusion encapsulation following the teachings of U.S. Pat. No. 3,704,137 and the same oil.

EXAMPLE 10

Preservative-free Orange Dry Flavor

| | (%) | wt. (DB) | wt. (as is) |
|---|---|---|---|
| Orange oil | 16.0 | 499.9 | 499.9 lbs. |
| HMCS, dry (Satinsweet 65) | 19.0 | 593.7 | 593.7 |
| Emulgum 29,000 gum-arabic | 20.0 | 624.9 | 624.9 |
| Lodex 10-malto-dextrin | 33.0 | 1031.0 | 1031.0 |
| Glycerin | 2.0 | 62.5 | 62.5 |
| Orange Juice, 63.4 Brix | 10.0 | 312.3 | 492.5 |
| Total | 100.0 | 3124.3 lbs. | 3304.5 lbs. |

Anti-caking agent: 0.5% TCP
$H_2O$ 421 gallons = 3502.7 lbs.
Batch Solids 45.9%

Add gum arabic to warm batch water (approx. 110° F.) under agitation. Next, add Lodex 10-maltodextrin and high maltose corn syrup solids (HMCS). Bring the batch to 160° F. and hold for 20 minutes. Pass the batch through a Sweco Screen and transfer to a holding tank. Add glycerine while the batch is still warm and then cool batch to 90° F. or below. Add orange juice, preservative-free orange oil and homogenize using a Manton-Gaulin homogenizer operating at 3000 psig. Dry in a commercial spray tower using an air inlet temperature of 350° F. and an outlet air temperature of 210° F.

During six hours of drying the moisture of the fixed dry product ranged from 2% to 4.5% and the free flow bulk density from 0.57 g/cc to 0.70 g/cc.

Spray-drying appears to be the method of choice in the present invention. Other drying techniques compromise the integrity of either the structure of the substrate or the presence of the volatile flavorant. Freeze-drying results in a product with a porous substrate from which a volatile would easily escape. Drum-drying requires maintaining fairly high temperatures for prolonged periods of time during which volatile flavorant loss from volatilization or degradation can occur. Spray-drying yields a substrate of a density of at least 0.55 g/cc and appears to have the least deleterious effect on the volatile flavorant.

EXAMPLE 11

| | (%) dry basis | lbs. as is |
|---|---|---|
| Orange Oil, (no preservative) | 16.0 | 160.0 lbs. |
| High Maltose Corn Syrup, 81% solids | 19.0 | 234.6 lbs. |
| Gum Arabic | 20.0 | 200.0 lbs. |
| Malto-dextrin (Lodex 10) | 33.0 | 330.0 lbs. |
| Glycerol | 2.0 | 20.0 lbs. |
| Orange Juice, 65 Brix | 10.0 | 153.8 lbs. |
| | 100.0% | 1098.4 lbs. |
| Anti-caking Agent | 0.5% | |

General Procedure: (for 45% solids feed)

Meter 135 gallons (1125 lbs.) of water to mixing tank. Start agitators and add the gum arabic and the malto-dextrin. Mix until a uniform suspension is obtained (if possible, also recirculate) Heat the mixture to 160°-180° F. to dissolve the solids and then cool to 90° F. Add the high-maltose corn syrup, glycerol and orange juice. Add the orange juice and uniformly mix until dispersed. Homogenize (2 stages) through Manton-Gaulin Homogenizer at 2000/6000 psig. to form an emulsion having an essential oil droplet size less than 4 micron. Spray-dry using the following conditions:

| Spray-Dryer Conditions | |
|---|---|
| Inlet Temperature: | 170° C. (340° F.) |
| Outlet Temperature: | 95° C.-100° C. (203° F.-212° F.) |
| Feed Solids: | 45%-50% |
| Finished Product | |
| Fix | 16.0% |
| Moisture | 4.5% (3.5%-5.5%) |
| Density: | free flow bulk density 0.66 g/cc (0.5-0.75) |
| Helium density: | 1.35 g/cc |
| Solubility: | Excellent |
| Appearance: | Free-flowing powder, no lumps |
| Color: | yellowish |
| Taste: | Clean, no burnt notes. |

Figure 2:
FIG. 2 is broken spray-dried material shown in FIG. 1 magnified 1000×.
Figure 3:
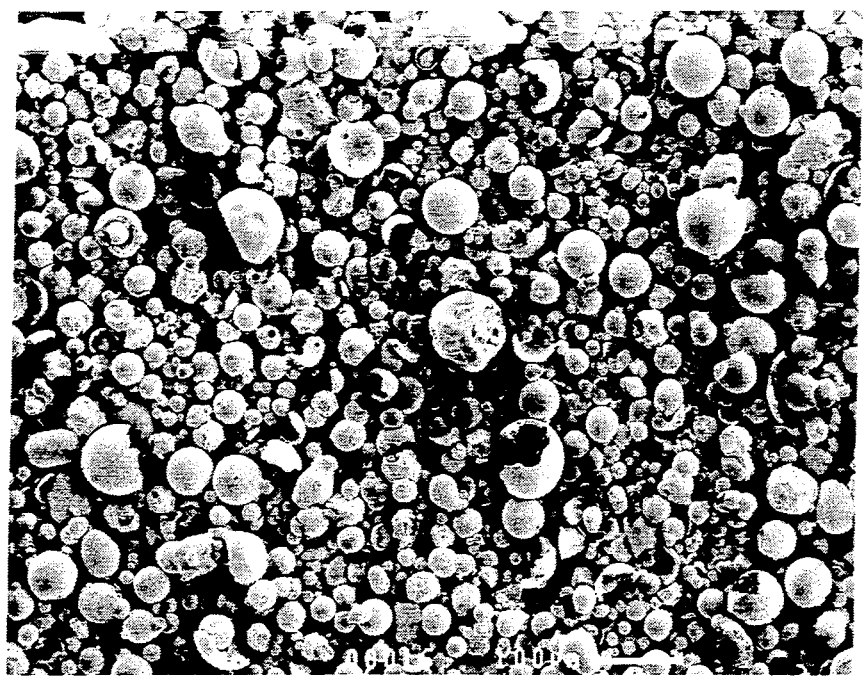
FIG. 3 is unbroken, spray-dried, hollow particles produced in accordance with prior art technology magnified 100×.
Figure 4:
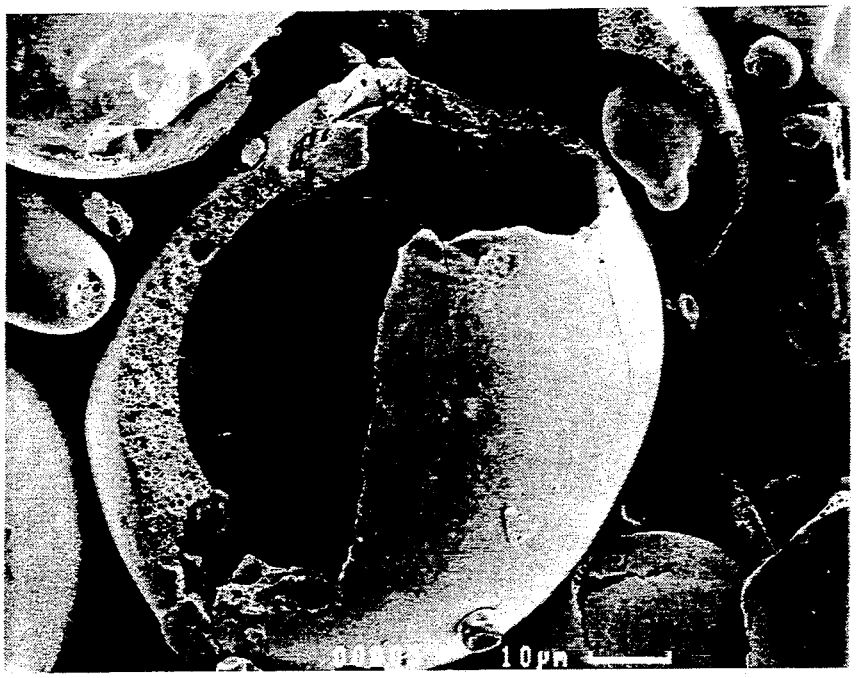
FIG. 4 is broken, spray-dried particles (shown unbroken in FIG. 3) magnified 1000×.

Photomicrographs of this product are shown as FIGS. 1 and 2. FIGS. 3 and 4 represent the prior art product of a carbohydrate matrix of 50% N-Lok modified starch and 50% Lodex malto-dextrin dissolved in water, emulsified with oil and dried in a manner similar to Example 11. The lack of voids in the product of Example 11 insure a stable preservative free dried flavor while the prior art product is subject to oxidation because of poor carbohydrate matrix protection giving an unacceptable product flavor on storage.

What is claimed:

1. A moisture and oxygen stable spray-dried fixed flavor having a free flow bulk density of at least 0.50 g/cc, and a void space of less than 20% of the spray-dried solids comprising a flavorant encapsulated in a carbohydrate matrix comprised of 22% to 45% mono and disaccharides wherein at least 50% of the mono and disaccharides is maltose, from 25% to 50% malto-dextrin, and from 10% to 35% high molecular weight film forming carbohydrate.

2. The spray-dried flavor of claim 1 wherein the film forming carbohydrate is selected from the group consisting of gum arabic, gum accacia, chemically modified starch and mixtures thereof.

3. The spray-dried flavor of claim 1 wherein the fixed flavor is an essential oil free of added preservative.

4. The spray-dried flavor of claim 1 wherein the fixed flavor is citrus oil.

5. The spray-dried flavor of claim 4 in which the mono or disaccharide contains juice solids in an amount up to 20% of the carbohydrate matrix.

6. The spray-dried flavor of claim 5 wherein the fruit juice solids are orange juice solids and/or lemon juice solids.

7. The spray-dried flavor of claim 1 which is free of preservatives.

8. The spray-dried flavor of claim 1 which further includes from 0.5% to 5% of a plasticizing agent selected from the group consisting of food-approved polyhydric alcohols and which includes from 5% to 20% flavor.

9. The spray-dried flavor of claim 1 wherein the moisture content is from 2% to 8%.

10. The spray-dried flavor of claim 1 comprising 10% to 20% preservative free citrus essential oil encapsulated in a matrix of 10% to 30% maltose, 10% to 30% film forming carbohydrate, 20% to 50% malto-dextrin and 1% to 5% polyol together with an anti-caking agent.

11. The spray-dried flavor of claim 1 containing 10% to 20% juice solids by weight of the carbohydrate matrix.

12. A process for producing a moisture and oxygen stable fixed flavorant composition comprising the steps of:
(a) forming an aqueous carbohydrate solution which contains on a solids basis from 22% to 45% mono and disaccharide wherein at least 50% of the mono and disaccharide is maltose, from 25% to 50% malto-dextrin, from 10% to 35% high molecular weight film forming carbohydrate selected from the group consisting of gum arabic, chemically modified starch, gum acacia and mixtures thereof;
(b) incorporating a flavorant into the solution of step (a) and thereafter;
(c) spray-drying the aqueous solution using an outlet air temperature of 100° C. or less to obtain a stable product having a free flow bulk density of at least 0.50 g/cc and a void space of less than 20% of the dried solids.

13. The process of claim 12 in which from 5% to 20% volatile flavor on a solid basis is fixed in the aqueous carbohydrate solution.

14. The process of claim 13 in which the film forming carbohydrate is gum arabic.

15. The process of claim 14 in which the flavorant is an essential oil free of antioxidant.

16. The process of claim 15 in which the essential oil is a citrus oil.

17. The process of claim 16 in which the mono and disaccharides include from 1% to 20% fruit juice solids on a dry basis.

18. The process of claims 12 wherein the spray-dried product is free of added preservatives.

19. The process of claim 18 in which the spray-dried product has a moisture content of 2% to 8%.

* * * * *